United States Patent [19]

Kip et al.

[11] 4,196,418

[45] Apr. 1, 1980

[54] DETECTION PLATE FOR AN IDENTIFICATION SYSTEM

[75] Inventors: Harm J. Kip, Lichtenvoorde; Tallienco W. H. Fockens, Eibergen, both of Netherlands

[73] Assignee: N.V. Nederlandsche Apparatenfabriek NEDAP, Groenlo, Netherlands

[21] Appl. No.: 847,148

[22] Filed: Oct. 31, 1977

[30] Foreign Application Priority Data

Nov. 1, 1976 [GB] United Kingdom ............... 45362/76

[51] Int. Cl.[2] .......................... H04Q 7/00; G01S 9/56
[52] U.S. Cl. ............................ 340/152 T; 343/6.5 SS
[58] Field of Search ................... 343/6.5 SS, 6.8 LC; 340/152 T

[56] References Cited

U.S. PATENT DOCUMENTS

| | | | |
|---|---|---|---|
| 3,299,424 | 1/1967 | Vinding | 343/6.5 SS |
| 3,701,150 | 10/1972 | Dame | 343/6.5 SS |
| 3,745,569 | 7/1973 | Works et al. | 343/6.5 SS |
| 3,859,624 | 1/1975 | Kriofsky et al. | 343/6.5 SS X |
| 3,964,024 | 6/1976 | Hutton et al. | 340/152 T |
| 3,981,011 | 9/1976 | Bell | 343/6.5 SS X |
| 4,087,791 | 5/1978 | Lemberger | 343/6.5 SS X |
| 4,129,855 | 12/1978 | Rodrian | 340/258 T |

Primary Examiner—T. H. Tubbesing
Attorney, Agent, or Firm—Fleit & Jacobson

[57] ABSTRACT

A detection plate for an identification system, comprising a resonant circuit, a switching device, and coding means, characterized in that the coding means comprises a digital circuit and is arranged to receive, in operation, supply voltage from the resonant circuit via rectifier means.

8 Claims, 6 Drawing Figures

DETECTION PLATE FOR AN IDENTIFICATION SYSTEM

This invention relates to a detection plate for an identification system for identifying persons, goods or animals passing a detection zone.

Such systems are already known and can be used, for example, in case certain locations in a building are accessible only to a pre-determined class of persons; or in case in a large warehouse goods are automatically transported and/or registered.

The persons, goods or animals carry a detection plate comprising an electrical circuit which generates a signal in response to an electromagnetic field generated in the detection zone, or modifies the strength of the electromagnetic field, which can be detected by suitable means.

If use is made of a signal generated and re-transmitted by the detection plate, there are, in addition to transmission means, provided receiving means for receiving the re-transmitted signal and processing it into a detection signal. If, on the other hand, use is made of the fact that the detection plate modifies the electromagnetic field generated, the only means required are transmission means for the electromagnetic field and means coupled with the transmission means for detecting the variation of the electrical load on the transmission means concomitant with the presence of a detection plate, and processing it into a detection signal.

The electrical circuit provided in the detection plates for an identification system is of such construction that a coded detection signal is formed, the coding depending on the class to which the detection plate, and hence the persons, animals or goods carrying it, belong. For convenience the plates will hereinafter be referred to as coded detection plates.

It will be clear that an identification system of the kind described above can be used also for identifying individuals.

In practice, such an identification system can be used, for example, in a cattle-shed where the animals, such as cows, are allowed to walk about freely. In the shed, there are a number of mangers, which are accessible to all the animals. For various reasons, however, it is desirable that each cow receives a particular food mix in a particular quantity precisely determined for that particular cow. This can be realized by providing each cow with a coded detection plate and forming a detection zone in the vicinity of each manger. In this way a cow present in front of a manger can be identified and the amount of food and the food mix can be adapted to that individual cow.

A coded detection plate for an identification system is described in U.S. Pat. No. 3,299,424. This known detection plate comprises a resonant circuit that can be periodically detuned by a switching device at a code frequency determined by an auxiliary circuit also provided in the detection plate. For an effective switch action, or coding, the prior detection plate must be provided with its own power source in the form of a battery. The use of batteries in detection plates, however, is a major drawback, as batteries must be replaced from time to time and in the period immediately preceding the replacement often have a lower output voltage, which may result in incorrect coding and misdetection.

It is an object of the present invention to remedy the drawbacks inherent in such prior detection plates.

According to the present invention, there is provided a detection plate for an identification system, comprising a resonant circuit, a switching device, and coding means, characterized in that the coding means comprises a digital circuit and is arranged to receive, in operation, a supply voltage from the resonant circuit via rectifier means.

One embodiment of the invention will now be described, by way of example, with reference to the accompanying drawings, in which FIG. 1 is a diagrammatic representation of one embodiment of a detection plate according to the present invention;

Figure 1:
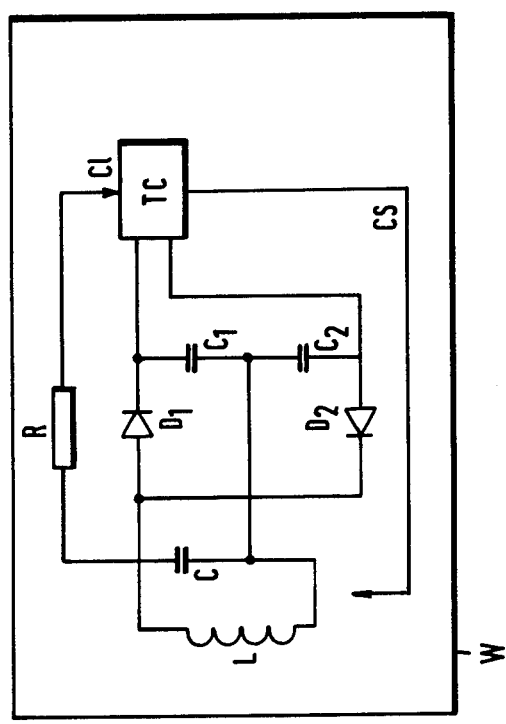

Referring to FIG. 1, there is shown a detection plate W in which is provided a resonant circuit comprising a coil L and a capacitor C, the resonance frequency of which corresponds with the frequency of an electromagnetic detection field generated in a detection zone. When the detection plate is introduced into the detection zone, the LC circuit is accordingly brought into resonance by the detection field. As a consequence, an AC voltage is generated across the LC circuit, in which, in this example, the coil and the capacitor are parallel-connected.

Via diodes D1 and D2 and capacitors C1 and C2, this AC voltage is converted into a DC supply voltage and supplied to a counting and coding circuit TC, designed as an integrated circuit.

The AC voltage generated across the LC circuit is further supplied via a resistor R to the counting input of the TC circuit. The peaks of the AC voltage can be used as stepping pulses for the counting portion of the TC circuit.

A counter with n sections has $2^n$ possible output combinations. A simple counter with 10 sections, therefore, has as many as 1024 different output states. By means of the coding section of the TC circuit, a code signal CS can now be formed that is characteristic of a given detection plate or group of detection plates and corresponds to one of the possible output states of the counter. This characteristic signal CS can be used for periodically detuning, or even short-circuiting, the resonant circuit at a rhythm determined by the coding portion of the TC circuit.

Detuning the resonant circuit can be effected by periodically connecting an additional capacitor in parallel with capacitor C or periodically short-circuiting a portion of coil L. It is also possible for the code signal CS to be used for periodically including a non-linear element into the circuit or for modulating an oscillator signal.

If a detection plate of the kind described is present within a detection field the resonant circuit is periodically detuned at a rhythm determined by the TC circuit, which results in a periodic attenuation of the signal re-transmitted by the detection plate, which can be easily detected, or in a modification of the energy absorption by the detection plate, which can also be detected. The specific rhythm of the attenuation or the variation in absorption makes it possible to identify persons, goods or animals carrying the detection plate.

Figure 2:
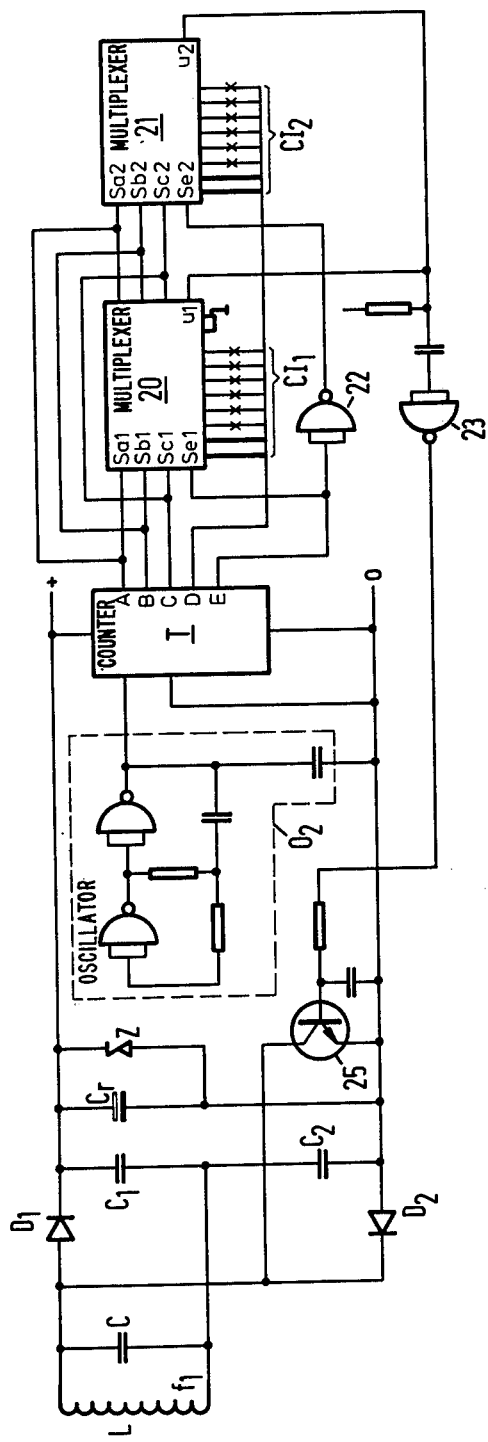
FIG. 2 shows a preferred embodiment of an electrical circuit for a detection plate according to the invention.

FIG. 2 shows in more detail an electrical circuit for a detection plate according to the present invention. As likewise shown in FIG. 1, the circuit comprises a resonant circuit comprising a coil L and a capacitor C connected in parallel. There are further provided rectifier means D1 and D2 and capacitors C1 and C2, which form a supply circuit to provide a supply voltage when the resonant circuit is in resonance. The supply circuit further comprises a storage capacitor Cr, as well as a Zener diode Z for limiting the voltage to a safe value.

In departure from the circuit of FIG. 1, the circuit of FIG. 2 comprises a separate oscillator 02, which oscillates as soon as the supply voltage provided by the resonant circuit reaches a suitable value. The oscillator 02 is built up in known manner from two NAND gates, commercially available as integrated circuits, and several resistors and capacitors. The advantages of the use of a separate oscillator 02, which supplies the counting pulses for a digital counter T, is that the frequency of the oscillator is highly stable and not dependent on external spurious effects. The pulses from the oscillator are supplied to the digital counter T, which is formed as an integrated circuit and receives supply voltage from the resonant circuit. The counter T has five outputs A, B, C, D and E, which in the embodiment shown are connected to two commercially available integrated digital multiplex circuits 20 and 21. The circuits 20 and 21 have a number of control inputs Sa1, Sb1, Sc1 and Se1 and Sa2, Sb2, Sc2 and Se2. Furthermore circuits 20 and 21 each have a number of coding inputs CI1 and CI2. The signals supplied to the control inputs determine which coding inputs are connected to the output terminals U1 and U2. The number of coding inputs determines the number of possible codings. It would be possible, therefore, for the number of possible codings to be increased by adding a third multiplex circuit.

Figure 3:
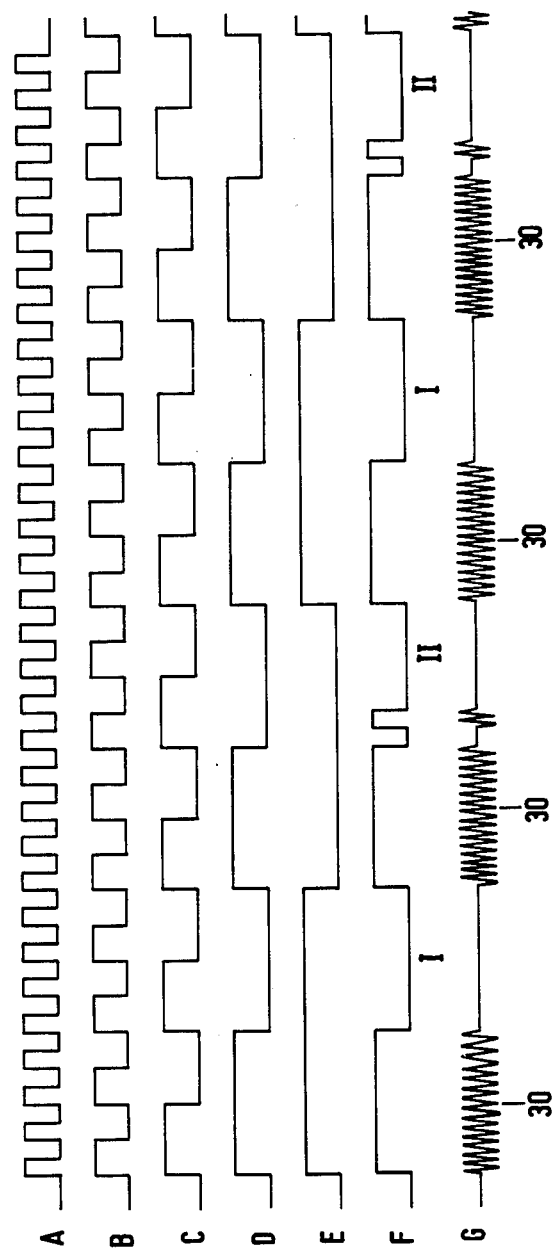
FIG. 3 shows various signal forms generated when the circuit of FIG. 2 is in operation.

FIG. 3 shows several signal forms produced in the circuit of FIG. 2. Respectively designated by A, B and C are the signals generated at the corresponding outputs of counter T and supplied to the inputs Sa1, Sb1, Sc1 and Sa2, Sb2, Sc2, respectively, of the multiplex circuits. D and E also designate output signals from the counter. These signals have a special function. Signal D is supplied not to a control input but to a coding input of the multiplex circuits. It is thus achieved that a coded signal is transmitted during certain time intervals only, in this case when signal D is low. The significance of this feature will be apparent from the following.

Signal E is supplied direct to the input Se1 of the first multiplex device, and via a NAND gate 22, in inverted form, to the input Se2 of the second multiplex circuit. It is thus achieved that if signal E has a high level, the first multiplex circuit 20 produces a code signal, and that, if signal E has a lower level, it is the second multiplex circuit 21 that produces a code signal.

The output signals from the multiplex circuits 20 and 21 are supplied, via a NAND gate 23, connected as an invertor, to a switching device. The switching device consists essentially of a transistor 25, which can be brought into the conductive or the non-conductive state by means of the code signals. An example of a signal supplied via a series resistor and a parallel capacitor to the base of the transistor is indicated at F in FIG. 3. I and II respectively designate the intervals in which the coding is derived from multiplex circuit 20 or 21.

The base of transistor 25 is controlled by means of signal F. If the transistor is in the conductive state, the resonant circuit is short-circuited in this example, this being a highly extreme manner of detuning the resonant circuit. The signal formed by the resonant circuit is shown at G in FIG. 3.

As the resonant circuit not only forms a coded signal, but also supplies the supply voltage for the coding means, the resonant circuit cannot remain short-circuited for too long a time. This is the reason for the processing of signal D, referred to above, which is effective to ensure that the resonant circuit is not short-circuited for at least 50% of the time, so that so-called energy-transfer blocks are formed in signal G. These energy-transfer blocks 30 can further be used to generate a synchronisation signal at the detection end of the system, which may be located both at the transmission end and at a separate receiving end of the system. The synchronisation signal can be processed into a clock signal which, upon synchronisation with the code signal, enters the latter into a shift register. In this way a suitable indication can be obtained as to possible spurious effects in the signal from the detection plate.

In addition to the periodical short-circuiting of the entire resonant circuit, there are other possibilities for the signal transfer between the detection plate and a decoder.

Figure 4:
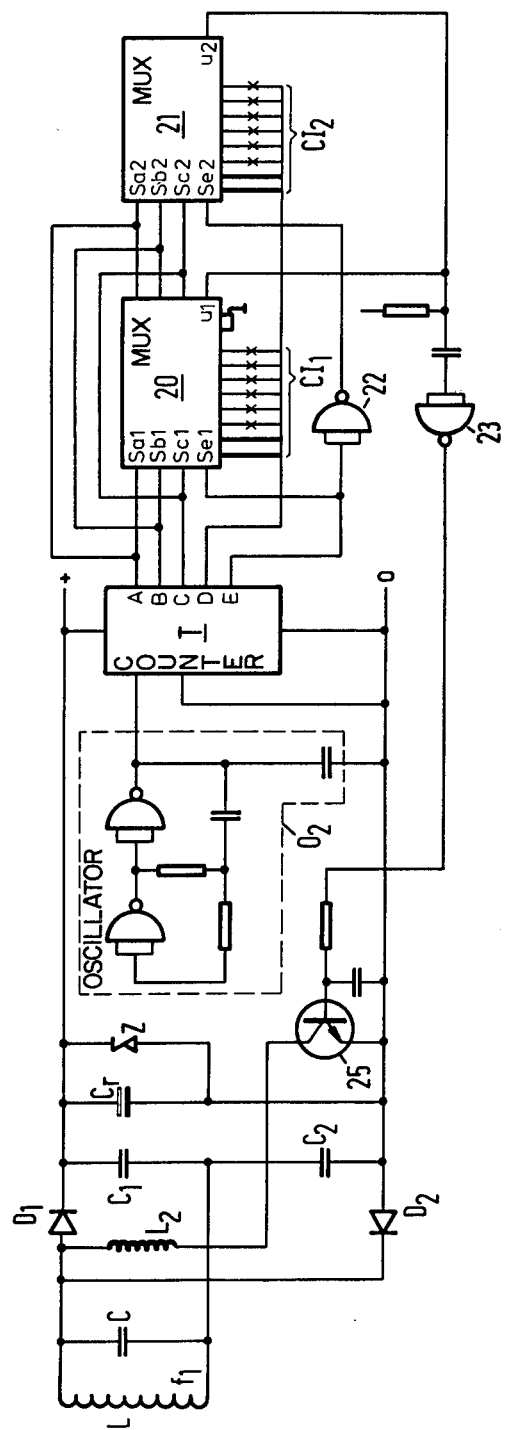
FIG. 4 shows an alternate embodiment of an electrical circuit for a detection plate according to the invention.
Figure 5:
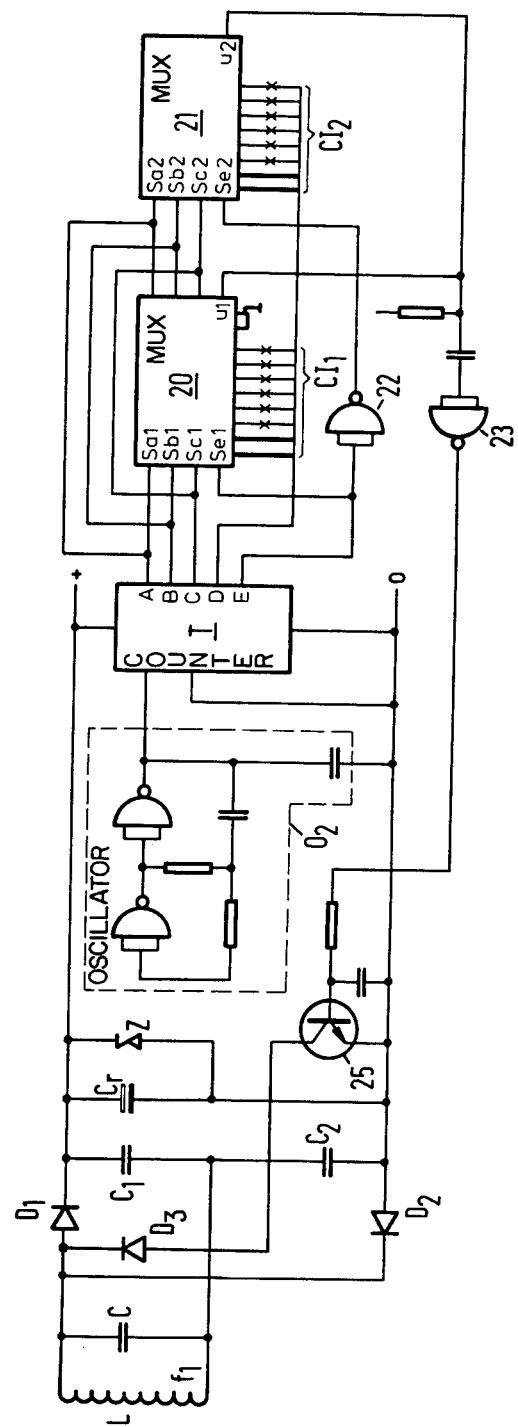
FIG. 5 shows another embodiment of an electrical circuit for a detection plate according to the invention.
Figure 6:
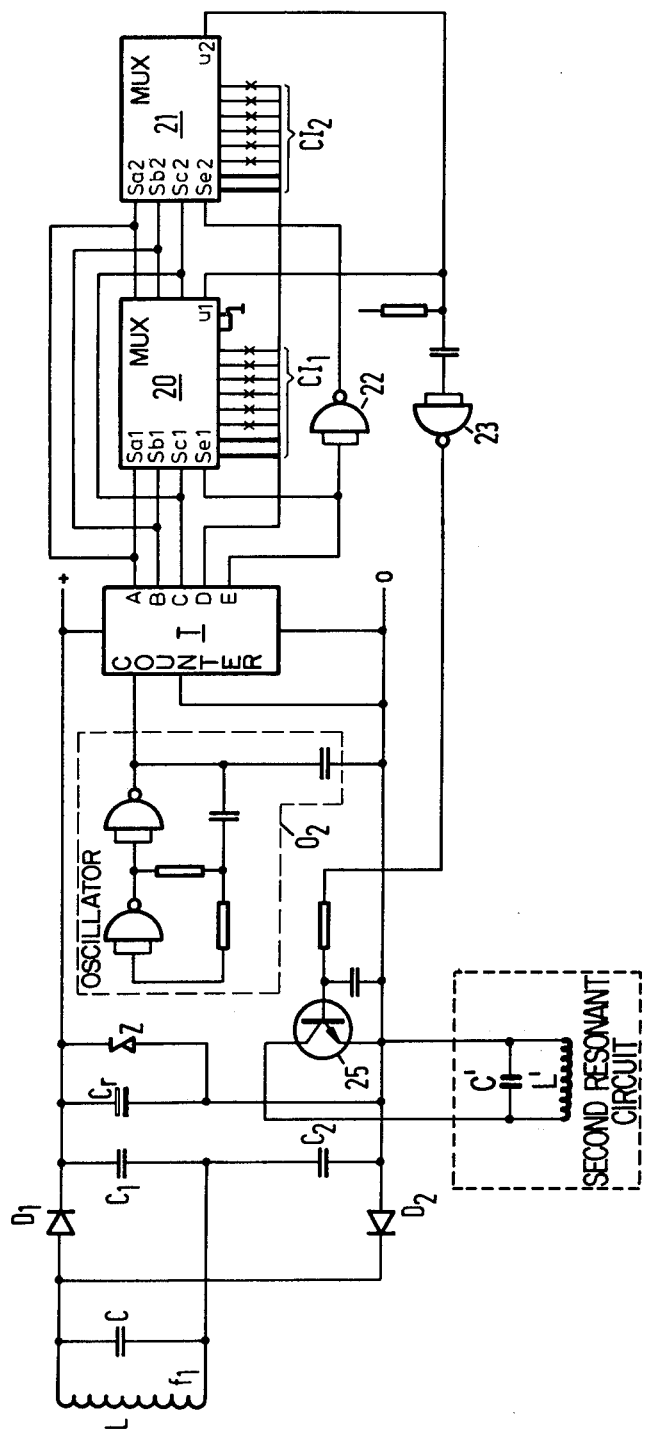
FIG. 6 shows still another embodiment of an electrical circuit for a detection plate according to the invention.

Thus by means of switch 25, for example, an additional coil, or an additional capacitor can be included in the resonant circuit, or uncoupled from the resonant circuit through the very short-circuiting of the resonant circuit. Furthermore it is possible for a non-linear element, such as a diode, to be periodically included in the resonant circuit by means of switch 25. In the first case the resonant circuit is detuned in a coded manner; in the second case the resonant circuit forms, in a coded manner, at least a third frequency, if there are two transmission frequencies in the first place. The above-described alternate embodiments of the electrical circuit for use in the inventive detection plate system are shown in FIGS. 4, 5 and 6.

The detection plate described can be used in both an identification system employing a transmitter that also serves as a receiver, and one employing a transmitter and a receiver.

Various modifications of the detection plate described will readily occur to those skilled in the art without departing from the scope of the present invention. The essential point is that the detection plate generates its own counting pulses from which a code is formed consisting of energy-transfer blocks and code blocks, the energy-transfer blocks serving to recover a synchronised signal at the detection end, by means for example, of a phase-loop circuit. There is thus produced in the detection plate a coding that is virtually insensitive to spurious effects, while the code can be detected at the detection end in a reliable manner.

We claim:

1. A detection plate for an identification system, comprising a resonant circuit, a switching device, a coding means, and a separate pulse generator fed by the resonant circuit, the output of said pulse generator being connected to the coding means characterized in that the coding means comprises a digital circuit containing at least one preselected code and is arranged to receive, in operation, both a supply voltage from the resonant circuit via rectifier means and control pulses from said separate pulse generator which are processed by said coding means for providing output signals according to said at least one preselected code, said output signals being fed to said switching device for affecting the resonance of said resonant circuit.

2. A detection plate according to claim 1 wherein said coding means comprises a digital counter and further comprising at least one digital multiplex circuit wherein the ouputs of the counter are connected to the control inputs of said at least one digital multiplex circuit, which further comprises a plurality of adjustable coding inputs and an output connected to control the switching means and wherein the control pulses are processed in said at least one digital multiplex circuit into said at least one preselected code signal that is supplied to the switching means.

3. A detection plate according to claim 2, wherein one output of the counter is connected to the coding inputs of each multiplex circuit to form periodic intervals during which the switching means is not energized.

4. A detection plate according to claim 2, wherein said at least one digital multiplex circuit comprises first and second digital multiplex circuits and one output signal from the counter is supplied direct to a control input of said first multiplex circuit and, a signal invertor connected to feed said one output signal to a control input of said second multiplex circuit, in order to cause the multiplex circuits to be alternately operative.

5. A detection plate according to claim 1, wherein the switching device is connected to said resonant circuit so as to selectively short circuit said resonant circuit upon the occurrence of the output signals from the coding means, thereby preventing said resonant circuit from resonating.

6. A detection circuit according to claim 1, further comprising an inductor connected to said resonant circuit and said switching means, whereby said switching means detunes the resonant circuit under the control of the coding means by connecting said inductor to the resonant circuit.

7. A detection plate according to claim 1, further comprising a non-linear element connected to said resonant circuit and said switching means whereby said non-linear element is connected to the resonant circuit by said switching means under the control of the coding means.

8. A detection circuit according to claim 1, further comprising a capacitor connected to said resonant circuit and said switching means, whereby said switching means detunes the resonant circuit under the control of the coding means by connecting said capacitor to the resonant circuit.

* * * * *